United States Patent
Hsu

(10) Patent No.: US 8,391,029 B2
(45) Date of Patent: Mar. 5, 2013

(54) DC-DC CONVERTER

(75) Inventor: Chia-Lung Hsu, Sinshih Township, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 341 days.

(21) Appl. No.: 12/959,677

(22) Filed: Dec. 3, 2010

(65) Prior Publication Data
US 2012/0139521 A1 Jun. 7, 2012

(51) Int. Cl.
*H02M 3/335* (2006.01)

(52) U.S. Cl. .................. 363/21.12; 363/16; 315/291

(58) Field of Classification Search .............. 363/16–20, 363/21.02, 26, 56.03, 49, 65, 86, 127; 323/222, 323/275, 282–290; 315/101, 166, 171, 194, 315/219, 221, 223, 224, 175, 291, 307
See application file for complete search history.

(56) References Cited

U.S. PATENT DOCUMENTS

| | | | | |
|---|---|---|---|---|
| 5,410,467 A * | 4/1995 | Smith et al. | ................... | 363/131 |
| 5,568,044 A * | 10/1996 | Bittner | ......................... | 323/272 |
| 6,388,896 B1 * | 5/2002 | Cuk | ................................ | 363/16 |
| 6,400,579 B2 * | 6/2002 | Cuk | ................................ | 363/16 |
| 6,798,177 B1 * | 9/2004 | Liu et al. | ....................... | 323/222 |
| 7,006,362 B2 * | 2/2006 | Mizoguchi et al. | ............. | 363/16 |

* cited by examiner

*Primary Examiner* — Rajnikant Patel
(74) *Attorney, Agent, or Firm* — McClure, Qualey & Rodack, LLP

(57) ABSTRACT

A DC-DC converter having a first and a second switch, an input diode, a magnetizing inductor, a resonant capacitor, a resonant inductor, an output diode and an output filter capacitor. The first and second switches are turned on alternatively. When the first switch is turned on, an input voltage is coupled to an anode of the input diode that has a cathode coupled to a first terminal of the magnetizing inductor. The second switch is designed to short a second terminal of the magnetizing inductor to a ground. The resonant capacitor and inductor, which are coupled in series, are disposed between the second terminal of the magnetizing inductor and the ground. A connection node between the resonant capacitor and inductor is coupled to the output filter capacitor, via the output diode, to regulate a voltage of the output filter capacitor. The regulated voltage is used in powering a load.

19 Claims, 4 Drawing Sheets

US 8,391,029 B2

DC-DC CONVERTER

BACKGROUND OF THE INVENTION

1. Field of the Invention

The present invention relates to a DC-DC converter, and in particular relates to a ZCS-PFM (zero current switching and pulse frequency modulation) DC-DC converter in DCM (discontinuous condition mode).

2. Description of the Related Art

A DC-DC converter is an electronic circuit which converts a direct current (DC) source from one voltage level to another. Switched-mode conversion is commonly used to realize a DC-DC converter, which converts one DC voltage level to another by storing the input energy temporarily and then releasing that energy so that it is outputted. The storage component may be a magnetic field storage component (inductors, transformers) or an electric field storage component (capacitors). Switches are provided so that energy may be transmitted into the storage component or be outputted therefrom.

Drawbacks of a switched-mode DC-DC converter include power dissipation cased by the switching operations and EMI (electromagnetic interference).

BRIEF SUMMARY OF THE INVENTION

The invention disclosed DC-DC converters using zero current switching (ZCS) and pulse frequency modulation (PFM) techniques, while being operated in a discontinuous condition mode (DCM).

A DC-DC converter in accordance with an exemplary embodiment of the invention comprises a first switch, a second switch, an input diode, a magnetizing inductor, a first resonant capacitor, a first resonant inductor, a first output diode and a first output filter capacitor. The first and second switches are turned on alternatively. When the first switch is turned on, an input voltage is coupled to an anode of the input diode. A cathode of the input diode is coupled to a first terminal of the magnetizing inductor. The second switch is designed to short a second terminal of the magnetizing inductor to a ground when is turned on. The first resonant capacitor and the first resonant inductor, which are coupled in series, are disposed between the second terminal of the magnetizing inductor and the ground. A first connection node, between the first resonant capacitor and inductor, is coupled to a first terminal of the first output filter capacitor, via the first output diode, to regulate a voltage of the first output filter capacitor. A second terminal of the first output filter capacitor is coupled to the ground. Furthermore, the first terminal of the first output filter capacitor is coupled to a first load to provide the first load with a first output voltage.

In some embodiments, a first terminal of the first resonant capacitor is coupled to the second terminal of the magnetizing inductor while a second terminal of the first resonant capacitor is coupled to the first connection node, and a first terminal of the first resonant inductor is coupled to the first connection node, while a second terminal of the first resonant inductor is coupled to the ground. In such embodiments, an anode and a cathode of the first output diode are coupled to the first connection node and the first terminal of the first output filter capacitor, respectively. The gain between the first output voltage and the input voltage may be positive.

In addition to the aforementioned circuit for a positive gain DC-DC converter, the circuit may further comprise a second resonant inductor, a second resonant capacitor, a second output diode and a second output filter capacitor. The second resonant inductor and capacitor are coupled in series between the second terminal of the magnetizing inductor and the ground, wherein a second connection node, between the second resonant inductor and capacitor, is coupled to a first terminal of the second output filter capacitor, via the second output diode, to regulate a voltage of the second output filter capacitor. The first resonant inductor has a first terminal coupled to the second terminal of the magnetizing inductor and a second terminal coupled to the second connection node. The second resonant capacitor has a first terminal coupled to the second connection node and a second terminal coupled to the ground. An anode of the second output diode is coupled to the first terminal of the second output filter capacitor, while a cathode of the second output diode is coupled to the second connection node. The first terminal of the second output filter capacitor is further coupled to a second load to provide the second node with a second output voltage. The gain between the second output voltage and the input voltage is negative.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several embodiments carrying out the invention. This description is made for the purpose of illustrating the general principles of the invention and should not be taken in a limiting sense. The scope of the invention is best determined by reference to the appended claims.

Figure 1:
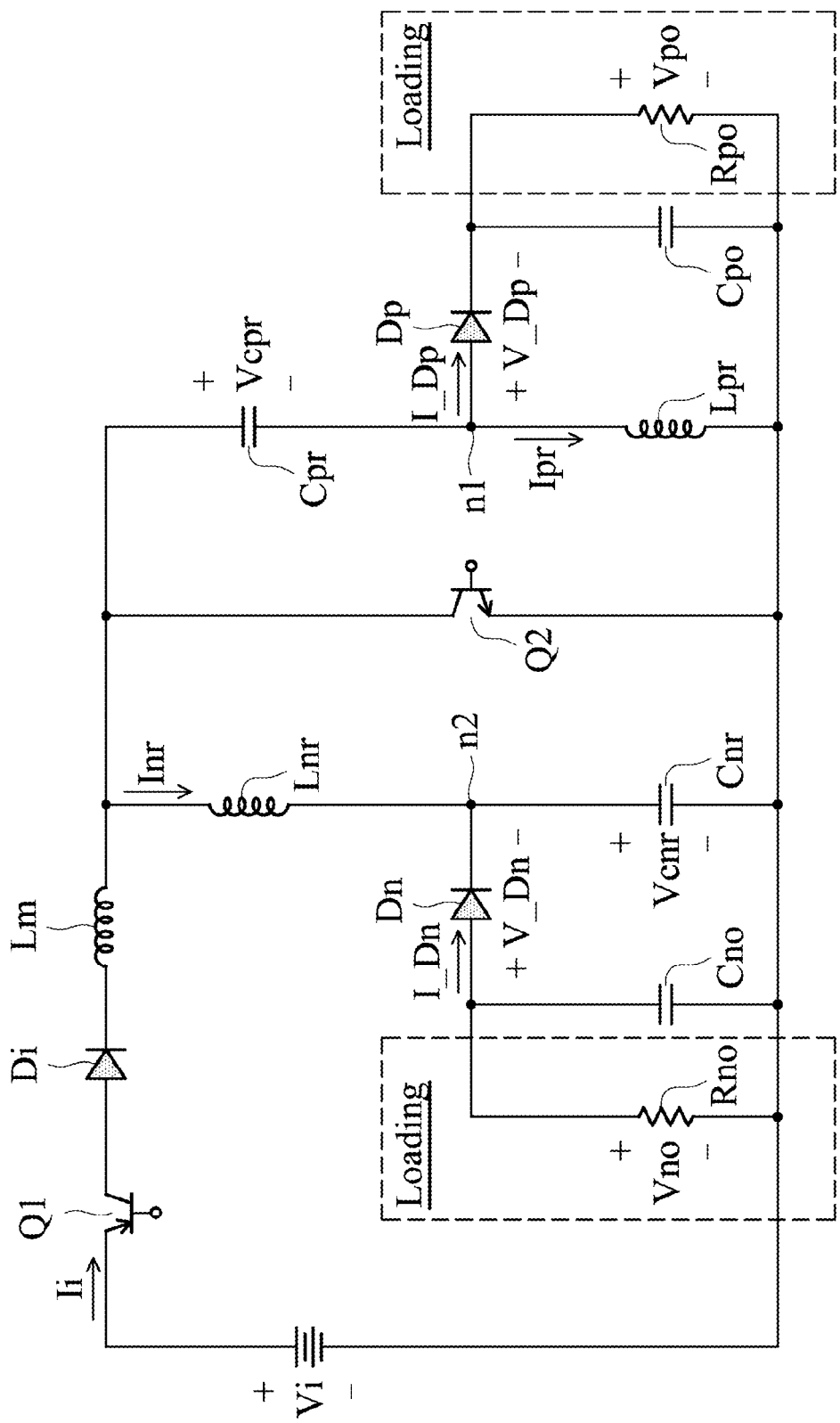
FIG. 1 depicts a DC-DC converter in accordance with an exemplary embodiment of the invention.

FIG. 1 depicts a DC-DC converter in accordance with an exemplary embodiment of the invention, which converts an input voltage Vi to a first output voltage Vpo by a positive gain, or converts the input voltage Vi to a second output voltage Vno by a negative gain.

As shown, the DC-DC converter comprises a first switch Q1, a second switch Q2, an input diode Di, a magnetizing inductor Lm, a first resonant capacitor Cpr, a first resonant inductor Lpr, a first output diode Dp, a first output filter capacitor Cpo, a second resonant inductor Lnr, a second resonant capacitor Cnr, a second output diode Dn, and a second output filter capacitor Cno. The size of the first and second output filter capacitors Cpo and Cno may be greater than the size of the first and second resonant capacitors Cpr and Cnr by a specific scale factor. The first switch Q1 and the second switch Q2 are turned on alternatively to transform the input energy.

The first switch Q1 is designed to couple the input voltage Vi to an anode of the input diode Di. A cathode of the input diode Di is coupled to a first terminal of the magnetizing inductor Lm. The second switch Q2 is disposed between a second terminal of the magnetizing inductor Lm and a ground. In parallel to the second switch Q2, the first resonant capacitor Cpr and the first resonant inductor Lpr are coupled in series between the second terminal of the magnetizing inductor Lm and the ground, and the second resonant inductor Lnr and the second resonant capacitor Cnr are coupled in series between the second terminal of the magnetizing inductor Lm and the ground as well. The circuit, including the first resonant capacitor Cpr, the first resonant inductor Lpr, the first output diode Dp and the first output filter capacitor Cpo, is designed to generate the positive gain output voltage Vpo for a first load Rpo. The circuit, including the second resonant inductor Lnr, the second resonant capacitor Cnr, the second output diode Dn and the second output filter capacitor Cno, is designed to generate the negative gain output voltage Vno for a second load Rno.

This paragraph discusses the connections of the components for the positive gain conversion. The first resonant capacitor Cpr has a first terminal coupled to the second terminal of the magnetizing inductor Lm and a second terminal coupled to a first connection node n1, which is eventually coupled to the first resonant inductor Lpr. The first resonant inductor Lpr has a first terminal coupled to the first connection node n1 and a second terminal coupled to the ground. The first output diode Dp has an anode coupled to the first connection node n1 and a cathode coupled to a first terminal of the first output filter capacitor Cpo. A second terminal of the first output filter capacitor Cpo is coupled to the ground. The first load Rpo is coupled at the first terminal of the first output filter capacitor Cpo. The first output voltage Vpo is generated by the disclosed components to supply the first load Rpo.

This paragraph discusses the connections of the components for the negative gain conversion. The second resonant inductor Lnr has a first terminal coupled to the second terminal of the magnetizing inductor Lm and a second terminal coupled to a second connection node n2, which is eventually coupled to the second resonant capacitor Cnr. The second resonant capacitor Cnr has a first terminal coupled to the second connection node n2 and a second terminal coupled to the ground. The second output diode Dn has a cathode coupled to the second connection node n2 and an anode coupled to a first terminal of the second output filter capacitor Cno. A second terminal of the second output filter capacitor Cno is coupled to the ground. The second load Rpo is coupled at the first terminal of the second output filter capacitor Cno. The second output voltage Vno is generated by the disclosed components to supply the second load Rno.

Figure 2:
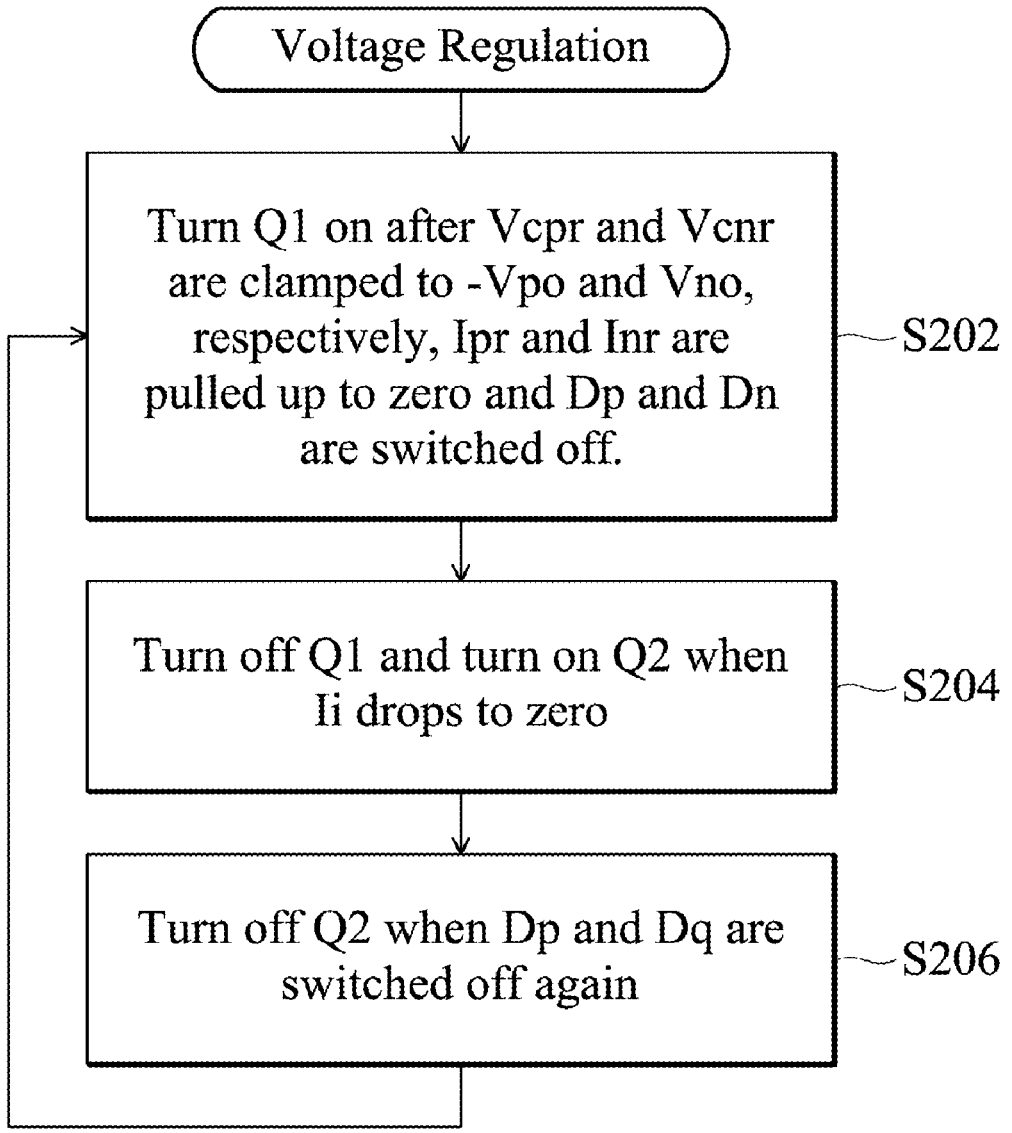
FIG. 2 illustrates a flowchart depicting an exemplary embodiment of the control schemes.

The following paragraphs discuss exemplary control schemes for the first switch Q1 and the second switch Q2. FIG. 2 illustrates a flowchart depicting an exemplary embodiment of the control schemes.

Referring to the flowchart of FIG. 2, it is shown that the output voltage Vp or Vn is regulated. In step S202, the first switch Q1 may be switched on after a first resonant voltage difference (Vcpr, between the first and second terminals of the first resonant capacitor Cpr) is clamped to (reaches and is maintained at) an inverse value of the first output voltage (−Vpo), a second resonant voltage difference (Vcnr, between the first and second terminals of the second resonant capacitor Cnr) is clamped to the second output voltage (Vno), a first resonant current (Ipr, flowing through the first resonant inductor Lpr from the first terminal to the second terminal thereof) and a second resonant current (Inr, flowing through the second resonant inductor Lnr from the first terminal to the second terminal thereof) are pulled up to zero and the first and second output diodes Dp and Dn are switched off In some embodiments, the first switch Q1 is switched on in accordance with any dead-time control technique which is familiar to those skilled in the art. In step S204, the first switch Q1 is switched off and the second switch Q2 is switched on when an input current Ii drops to zero. In step S206, the second switch Q2 is switched off when the first and second output diodes Dp and Dn are switched off again. The three steps S202, S204 and S206 are repeated again and again and the output voltage Vp and Vn are regulated, accordingly.

The flowchart of FIG. 2 is not intended to limit the control scheme of the first and second switches Q1 and Q2. The timing of switching the states of the first and second switches Q1 and Q2 may be revised to operate in coordination with the other components of the DC-DC converter.

Figure 3:
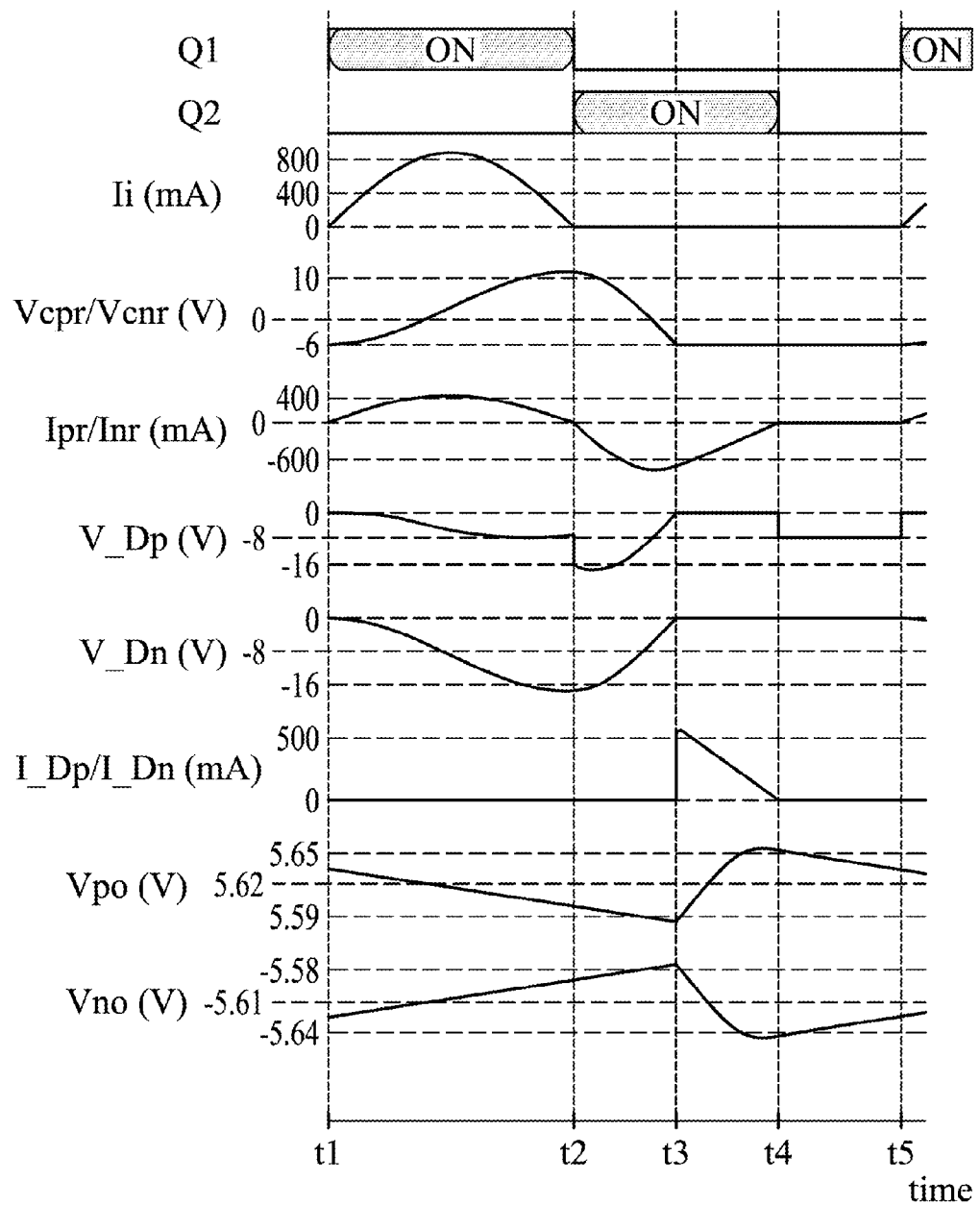
FIG. 3 depicts waveforms of the signals of FIG. 1.

According to the control scheme of FIG. 2, the DC-DC converter of FIG. 1 is switched between four operation modes repeatedly. FIG. 3 depicts waveforms of the signals of FIG. 1.

During a first time interval t1~t2, the DC-DC converter is operated in a first operation mode. The first switch Q1 is switched on and the second switch Q2 is maintained off. At the beginning of the first operation mode (time t1), the initial values of the first and second resonant currents Ipr and Inr are zero, the initial value of the first resonant voltage difference Vcpr is −Vpo, the initial value of the second resonant voltage difference Vcnr is Vno, and the first and second output diodes Dp and Dn are off With the conduction provided by the first switch Q1, the input current Ii is generated and the first and second resonant capacitors Cpr and Cnr are charged through resonant networks corresponding thereto. When the first and second resonant voltage differences Vcpr and Vcnr reach zero, the first and second resonant currents Ipr and Inr are at their maximum values. The first and second resonant voltage differences Vcpr and Vcnr keep rising until the first and second resonant currents Ipr and Irn and the input current Ii are decreased to zero. As shown, the first and second output diodes Dp and Dn are reversely biased during the first time interval t1~t2, so that the first and second output diodes Dp and Dn are maintained at off during the first operation mode. The loop constructed by the first output filter capacitor Cpo and the first load Rpo may cause a slight drop in the first output voltage Vpo. The loop constructed by the second output filter capacitor Cno and the second load Rno may cause a slight rise in the second output voltage Vno.

At time t2 (when the input current Ii drops to zero), the first switch Q1 is switched off and the second is switched on and then the second time interval t2~t3 for a second operation mode starts. At this stage, the input current Ii is clamped at zero and the first and second resonant currents Ipr and Inr drop to negative values. With the short circuit provided by the turned-on second switch Q2, the first and second resonant capacitors Cpr and Cnr are discharged by the resonant networks corresponding thereto. When the first and second resonant voltage differences Vcpr and Vcnr drop to zero, the first and second resonant currents Ipr and Inr are at their minimum values. At time t3, the first and second resonant voltage differences Vcpr and Vcnr fall to −Vpo and Vno, respectively, and the first and second output diodes Dp and Dn are switched on accordingly to produce currents I_Dp and I_Dn during the next time interval t3~t4.

During a third time interval t3~t4, a third operation mode is provided. In this stage, the first and second output diodes Dp and Dn are forward biased, so that the first and second resonant voltage differences Vcpr and Vcnr are clamped at −Vpo and Vno, respectively. Because the size of the first and second output filter capacitors Cpo and Cno are designed to be much greater than that of the first and second resonant capacitors Cpr and Cnr, the currents I_Dp and I_Dn through the first and second output diodes Dp and Dn approach the absolute values of the first and the second resonant currents Ipr and Inr, respectively. During the third time interval t3~t4, the first output voltage Vpo is slightly raised back to a higher level and the second output voltage Vno is slightly pulled down to a lower level. At time t4, the first and second resonant currents Ipr and Inr are clamped to zero, and the first and second output diodes Dp and Dn are switched off.

At time t4, the second switch Q2 is switched off and the DC-DC converter is switched to a fourth operation mode, accordingly. Note that both of the first and second switches Q1 and Q2 are turned off and the first and second output diodes Dp and Dn are also turned off. Again, the first output voltage Vpo is slightly, pulled down to a lower level because of the loop constructed from the first output filter capacitor Cpo and the first load Rpo, and the second output voltage Vno is slightly raised back to a higher level because of the loop constructed from the second output filter capacitor Cno and the second load Rno. Because the first resonant voltage difference Vcpr is clamped to an inverse value of the first output voltage (−Vpo), the second resonant voltage difference Vcnr is clamped to the second output voltage Vno, the first and second resonant currents Ipr and Inr are pulled up to zero and the first and second output diodes Dp and Dn are switched off again, the first switch Q1 may be switched on again at time t5, to start another output voltage regulation cycle. The timing to switch on the first switch Q1 may be based on the loading from the first and second loads Rpo and Rno. Accordingly, herein, the dead-time control technique is a preferred technique choice.

FIG. 3 shows that the first output voltage Vpo is regulated around a positive value (i.e. about +5.6V), and the second output voltage Vno is regulated around a negative value (i.e. about −5.6V). The DC-DC converter introduced in FIG. 1 successfully converts the input voltage Vi into a positive gain output voltage Vpo and a negative gain output voltage Vno.

The control scheme of the first and second switches Q1 and Q2 are based on zero current switching (ZCS) techniques and zero voltage switching (ZVS) techniques. At time t1, the first switch Q1 is switched on, while the input current Ii is zero, through zero current switching. At time t2, the first switch Q1 is turned off, when the input current Ii is returned to zero, through zero current switching. At time t3, the first and second output diodes Dp and Dn are switched on during a ZVS event, wherein the voltage differences V_Dp and V_Dn across the first and second output diodes Dp and Dn approximate zero. At time t4, the first and second output diodes Dp and Dn are switched off during an ZCS event, wherein the currents I_Dp and I_Dn through the first and second output diodes Dp and Dn are zero.

In some embodiments, the first and second switches Q1 and Q2 are realized by bipolar junction transistors (BJTs) having minimal power consumption. Because tailing-current loss can be eliminated, BJT characteristics are suitable for the zero current switching techniques herein. In order to decrease current stress, unnecessary energy flow should be avoided. Accordingly, unidirectional switches may be employed herein.

In another exemplary embodiment, a DC-DC converter only providing the disclosed positive gain conversion is introduced. This kind of DC-DC converter does not contain the components for the negative gain conversion (for example, does not include the second resonant inductor and capacitor Lnr and Cnr, the second output diode Dn and the second output filter capacitor Cno). In such cases, the first switch Q1 is switched on after the first resonant voltage difference Vcpr is clamped to the inverse value of the first output voltage (−Vpo), the first resonant current Ipr is pulled up to zero and the first output diode Dp is switched off. Furthermore, the first switch Q1 may be switched off and the second switch Q2 may be switched on when the input current Ii drops to zero. The second switch Q2 may be switched off when the first output diode Dp is switched off again.

In another exemplary embodiment, a DC-DC converter only providing the disclosed negative gain conversion is introduced. This kind of DC-DC converter does not contain the components for the positive gain conversion (for example, does not include the first resonant capacitor and inductor Cpr and Lpr, the first output diode Dp and the first output filter capacitor Cpo). In such cases, the first switch Q1 is switched on after the second resonant voltage difference Vcnr is clamped to the second output voltage Vno), the second resonant current Inr is pulled up to zero and the second output diode Dn is switched off. Furthermore, the first switch Q1 may be switched off and the second switch Q2 may be switched on when the input current Ii drops to zero. The second switch Q2 may be switched off when the second output diode Dn is switched off again.

The following paragraphs show a design guidance of the DC-DC converter.

Figure 4:
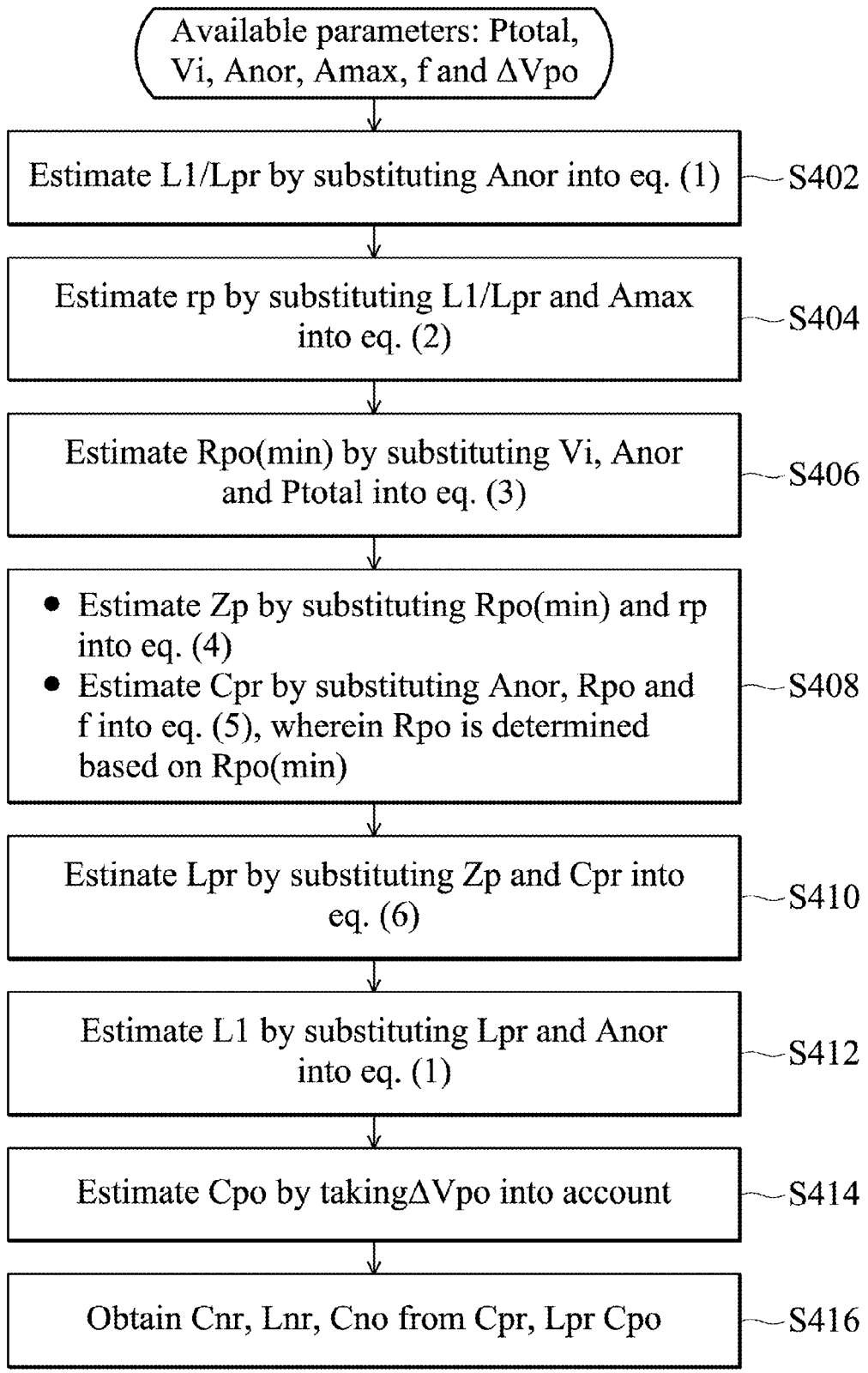
FIG. 4 illustrates a flowchart depicting the design guidance.

FIG. 4 illustrates a flowchart depicting the design guidance for symmetrical positive gain and negative gain voltage conversion. The upper limit of the total power consumption Ptotal, the input voltage Vi, the normal positive voltage gain Anor, the upper limit of the positive voltage gain Amax, the output voltage regulation frequency f and the upper limit $\Delta Vpo$ of the ripple in the positive gain output voltage Vpo are determined by the user as available parameters of the DC-DC converter design. Five equations (1)~(5) are introduced herein.

$$\frac{L1}{Lpr} > \frac{1}{2Anor} \qquad \text{Equation (1)}$$

$$rp = \frac{Amax^2}{1+Amax} \cdot \left[\frac{\pi}{2} \cdot \left(1 + \sqrt{1 + \frac{2L1}{Lpr}}\right) + \frac{\sqrt{1+Amax}}{Amax} - \frac{1}{2} \cdot \cos^{-1}\left(\frac{Amax}{2+Amax}\right)\right] \qquad \text{Equation (2)}$$

$$Rpo(min) = \frac{(Anor \cdot Vi)^2}{Ptotal/2} \qquad \text{Equation (3)}$$

$$Zp = \frac{Rpo(min)}{rp} \qquad \text{Equation (4)}$$

$$\frac{Anor^2}{1+Anor} = 2 \cdot Rpo \cdot Cpr \cdot f \qquad \text{Equation (5)}$$

$$Zp = \sqrt{\frac{Lpr}{Cpr}} \qquad \text{Equation (6)}$$

The design guidance is discussed in the following for a case wherein Ptotal is 0.5 W, Vi is 2.8V, Anor is 2, Amax is 3, f is 5 MHz and $\Delta Vpo$ is ±1%·Vpo. In step S402, a value L1/Lpr is estimated by substituting Anor into equation (1), wherein by further taking the reliable margin into account, L1/Lp may be set to be 0.5. In step S404, a value rp is estimated by substituting L1/Lp and Amax into equation (2). rp is set to 8.989. In step S406, the minimum value of the first load Rpo(min) is estimated by substituting Vi, Anor and Ptotal into equation (3). Rpo(min) is set to 125 ohm. In step S408, a value Zp is estimated by substituting Rpo(min) and rp into equation (4), and the first resonant capacitor Cpr is estimated by substituting Anor, Rpo (determined based on Rpo(min)) and f into equation (5). Zer is set to be 14 ohm. The first resonant capacitor Cpr is set to be 2.2 nF. In step S410, the first resonant inductor Lpr is estimated by substituting Zp and Cpr into equation (6). The first resonant inductor Lpr is set to be 0.47 uH. In step S412, the magnetizing inductor L1 is estimated by substituting Lpr and Anor into equation (1). The magnetizing inductor L1 is set to 0.22 uH. In step S414, the first output filter capacitor Cpo is estimated by taking the ripple limit ΔVpo into account. Based on the following equation:

$$\frac{1}{Cpo}\int_{t3}^{t4} Ipr(t)dt \leq \frac{2}{100}Vpo,$$

the first output filter capacitor Cpo is set to 0/18 uF. In step S416, the second resonant capacitor Cnr, the second resonant inductor Lnr, and the second output filter capacitor Cno are obtained, based on the estimated values of the first resonant capacitor Cpr, the first resonant inductor Lpr and the first output filter capacitor Cpo.

The flowchart of FIG. 4 and the estimated values L1, Cpr, Lpr, Cpo, Cnr, Lnr and Cno are not intended to limit the scope of the invention. The DC-DC converter of FIG. 1 may be realized by other design principles familiar to a person skilled in the art.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A DC-DC converter, comprising
an input diode, a first output diode and a first output filter capacitor;
a first switch, operative to couple an input voltage to an anode of the input diode;
a magnetizing inductor, having a first terminal and a second terminal, wherein the first terminal of the magnetizing inductor is coupled to a cathode of the input diode;
a second switch, operative to couple the second terminal of the magnetizing inductor to a ground; and
a first resonant capacitor and a first resonant inductor, coupled in series between the second terminal of the magnetizing inductor and the ground, wherein a first connection node, between the first resonant capacitor and the first resonant inductor, is coupled to a first terminal of the first output filter capacitor, via the first output diode, to regulate a voltage of the first output filter capacitor;
wherein:
a second terminal of the first output filter capacitor is coupled to the ground;
the first terminal of the first output filter capacitor is further coupled to a first load to provide the first load with a first output voltage; and
the first switch and the second switch are turned on alternately.

2. The DC-DC converter as claimed in claim 1, wherein the first output filter capacitor is greater than the first resonant capacitor by a specific scale factor.

3. The DC-DC converter as claimed in claim 1, wherein:
the first resonant capacitor has a first terminal coupled to the second terminal of the magnetizing inductor and a second terminal coupled to the first connection node;
the first resonant inductor has a first terminal coupled the first connection node and a second terminal coupled to the ground; and
the first output diode has an anode coupled to the first connection node and a cathode coupled to the first terminal of the first output filter capacitor.

4. The DC-DC converter as claimed in claim 3, wherein:
the first switch is switched on after a first resonant voltage difference reaches and is maintained at an inverse value of the first output voltage, a first resonant current is pulled up to zero and the first output diode is switched off;
the first resonant voltage difference is measured between the first and second terminals of the first resonant capacitor; and
the first resonant current flows from the first terminal to the second terminal of the first resonant inductor.

5. The DC-DC converter as claimed in claim 4, wherein the first switch is switched on in accordance with a dead-time control technique.

6. The DC-DC converter as claimed in claim 4, wherein the first switch is switched off and the second switch is switched on when an input current drops to zero.

7. The DC-DC converter as claimed in claim 6, wherein the second switch is switched off when the first output diode is switched off again.

8. The DC-DC converter as claimed in claim 1, wherein:
the first resonant inductor has a first terminal coupled to the second terminal of the magnetizing inductor and a second terminal coupled to the first connection node;
the first resonant capacitor has a first terminal coupled to the first connection node and a second terminal coupled to the ground; and
the first output diode has a cathode coupled to the first connection node and an anode coupled to the first terminal of the first output filter capacitor.

9. The DC-DC converter as claimed in claim 8, wherein:
the first switch is switched on after a first resonant voltage difference reaches and is maintained at a value of the first output voltage, a first resonant current is pulled up to zero and the first output diode is switched off;
the first resonant voltage difference is measured between the first and second terminals of the first resonant capacitor; and
the first resonant current flows from the first terminal to the second terminal of the first resonant inductor.

10. The DC-DC converter as claimed in claim 9, wherein the first switch is switched on in accordance with a dead-time control technique.

11. The DC-DC converter as claimed in claim 9, wherein the first switch is switched off and the second switch is switched on when an input current drops to zero.

12. The DC-DC converter as claimed in claim 11, wherein the second switch is switched off when the first output diode is switched off again.

13. The DC-DC converter as claimed in claim 3, further comprising:
a second output diode and a second output filter capacitor; and
a second resonant inductor and a second resonant capacitor, coupled in series between the second terminal of the magnetizing inductor and the ground, wherein:
a second connection node, between the second resonant inductor and the second resonant capacitor, is coupled to a first terminal of the second output filter capacitor, via the second output diode, to regulate a voltage of the second output filter capacitor;

the second resonant inductor has a first terminal coupled to the second terminal of the magnetizing inductor and a second terminal coupled to the second connection node; and the second resonant capacitor has a first terminal coupled to the second connection node and a second terminal coupled to the ground;

wherein:

the second output diode has a cathode coupled to the second connection node and an anode coupled to the first terminal of the second output filter capacitor;

the first terminal of the second output filter capacitor is further coupled to a second load to provide the second load with a second output voltage; and a second terminal of the second output filter capacitor is coupled to the ground.

14. The DC-DC converter as claimed in claim 13, wherein the size of the first and second output filter capacitors are greater than the size of the first and second resonant capacitors by a specific scale factor.

15. The DC-DC converter as claimed in claim 13, wherein:

the first switch is switched on after a first resonant voltage difference reaches and is maintained at an inverse value of the first output voltage, a second resonant voltage difference reaches and is maintained at the second output voltage, a first resonant current and a second resonant current are pulled up to zero and the first and second output diodes are switched off;

the first resonant voltage difference is measured between the first and second terminals of the first resonant capacitor;

the second resonant voltage difference is measured between the first and second terminals of the second resonant capacitor;

the first resonant current flows from the first terminal to the second terminal of the first resonant inductor; and the second resonant current flows from the first terminal to the second terminal of the second resonant inductor.

16. The DC-DC converter as claimed in claim 15, wherein the first switch is switched on in accordance with a dead-time control technique.

17. The DC-DC converter as claimed in claim 15, wherein the first switch is switched off and the second switch is switched on when an input current drops to zero.

18. The DC-DC converter as claimed in claim 17, wherein the second switch is switched off when the first and second output diodes are switched off again.

19. The DC-DC converter as claimed in claim 1, wherein: the first and second switches are bipolar junction transistors.

* * * * *